(12) United States Patent
Kataishi

(10) Patent No.: US 12,473,480 B2
(45) Date of Patent: *Nov. 18, 2025

(54) THERMALLY CONDUCTIVE GREASE AND METHOD FOR PRODUCING SAME

(71) Applicant: Fuji Polymer Industries Co., Ltd., Nagoya (JP)

(72) Inventor: Takumi Kataishi, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 706 days.

This patent is subject to a terminal disclaimer.

(21) Appl. No.: 17/796,165

(22) PCT Filed: Apr. 16, 2021

(86) PCT No.: PCT/JP2021/015687
§ 371 (c)(1),
(2) Date: Jul. 28, 2022

(87) PCT Pub. No.: WO2022/054330
PCT Pub. Date: Mar. 17, 2022

(65) Prior Publication Data
US 2023/0085185 A1    Mar. 16, 2023

(30) Foreign Application Priority Data

Sep. 11, 2020  (JP) .................. 2020-153182

(51) Int. Cl.
*C09K 5/14* (2006.01)
*C08K 3/22* (2006.01)
*C08K 3/36* (2006.01)
*C08K 3/08* (2006.01)

(52) U.S. Cl.
CPC .............. *C09K 5/14* (2013.01); *C08K 3/22* (2013.01); *C08K 3/36* (2013.01); *C08K 2003/0812* (2013.01)

(58) Field of Classification Search
None
See application file for complete search history.

(56) References Cited

U.S. PATENT DOCUMENTS

| | | |
|---|---|---|
| 2009/0062167 A1 | 3/2009 | Kaneko |
| 2017/0226396 A1 | 8/2017 | Yang et al. |
| 2019/0359875 A1 | 11/2019 | Nishio et al. |
| 2021/0147738 A1 | 5/2021 | Takanashi et al. |

FOREIGN PATENT DOCUMENTS

| | | | |
|---|---|---|---|
| CN | 101400769 | 4/2009 | |
| CN | 107075400 | 8/2017 | |
| JP | 2006-096973 | 4/2006 | |
| JP | 2010-077220 | 4/2010 | |
| JP | 2010-278115 | 12/2010 | |
| JP | 2013-071990 | 4/2013 | |
| JP | 2014-122307 | 7/2014 | |
| JP | 2016-044213 | 4/2016 | |
| JP | 2017-530220 | 10/2017 | |
| JP | 2018-104714 | 7/2018 | |
| JP | 2018-145025 | 9/2018 | |
| JP | 2021-080316 | 5/2021 | |
| WO | 2010/007804 | 1/2010 | |
| WO | WO-2011007638 A1 * | 1/2011 | ................ C01F 5/02 |
| WO | 2021/084787 | 5/2021 | |

OTHER PUBLICATIONS

International Search Report issued in International Application No. PCT/JP2021/015687, Jul. 20, 2021, 7 pages w/ translation.
Office Action issued in corresponding Chinese Patent Application No. 202180017600.7, Jul. 19, 2025, 15 pages w/ translation.

* cited by examiner

*Primary Examiner* — Tanisha Diggs
(74) *Attorney, Agent, or Firm* — HSML P.C.

(57) ABSTRACT

A thermally conductive grease of the present invention contains a liquid olefin polymer and thermally conductive particles. The liquid olefin polymer is an ethylene α-olefin copolymer having a kinematic viscosity at 40° C. of 10,000 mm$^2$/s or less. The thermally conductive grease contains 400 to 2000 parts by mass of the thermally conductive particles based on 100 parts by mass of the liquid olefin polymer. Alumina particles with a median particle diameter of 0.1 to 5 μm constitute 5 to 80% by mass of 100% by mass of the thermally conductive particles. Other thermally conductive particles constitute 20 to 95% by mass of 100% by mass of the thermally conductive particles. The thermally conductive grease has an absolute viscosity at 23° C. of 300 to 7000 Pa·s measured by a B-type viscometer using a T-E spindle at a rotational speed of 5 rpm.

7 Claims, 1 Drawing Sheet

THERMALLY CONDUCTIVE GREASE AND METHOD FOR PRODUCING SAME

TECHNICAL FIELD

The present invention relates to a thermally conductive grease suitable for being filled between a heating element such as an electrical component, an electronic component or the like and a heat dissipater, and a method for manufacturing the same.

BACKGROUND ART

Recently, the performance of semiconductors such as CPUs has improved appreciably, and the amounts of heat generated by the semiconductors have increased enormously. To cope with this, heat dissipaters are attached to electronic components that generate heat, and thermally conductive silicone greases are used to improve the contact between the heating elements such as the semiconductors and the heat dissipaters. Further, along with the size reduction, high performance, and high integration of devices, the thermally conductive silicone greases are required to have high thermal conductive properties and resistance to drop impact. Patent Document 1 proposes a composition containing a thermally conductive filler, a polyorganosiloxane resin including at least one polysiloxane having one curable functional group per molecule, and a siloxane compound having an alkoxysilyl group and a linear siloxane structure to prevent bleeding out. Patent Document 2 proposes a thermally conductive silicone composition containing a liquid silicone, a thermally conductive filler, and hydrophobic spherical silica fine particles to improve heat dissipation properties. Patent Document 3 proposes cross-linking a composition containing liquid ethylene-propylene copolymer rubber, an organic peroxide crosslinking agent, and a metal hydroxide filler, and molding the composition.

PRIOR ART DOCUMENTS

Patent Documents

Patent Document 1: JP 2018-104714 A
Patent Document 2: JP 2016-044213 A
Patent Document 3: JP 2010-077220 A

DISCLOSURE OF INVENTION

Problem to be Solved by the Invention

However, there is a problem that a conventional grease-like composition based on a liquid organopolysiloxane generates a low molecular weight siloxane. There is a problem that the low molecular weight siloxane can be oozed out of or volatilized from the composition and cause an electric contact fault. Moreover, there is a problem that the composition of Patent Document 3 is not so thermally conductive since a predetermined amount of the metal hydroxide filler such as aluminum hydroxide needs to be added to the composition to exhibit flame retardancy.

To solve the conventional problems, the present invention provides a thermally conductive grease that generates no low molecular weight siloxane and achieves an absolute viscosity and thermal conductive properties suitable for thermal interface material (TIM) applications.

Means for Solving Problem

A thermally conductive grease of the present invention contains a liquid olefin polymer and thermally conductive particles. The liquid olefin polymer is an ethylene α-olefin copolymer having a kinematic viscosity at 40° C. of 10,000 mm²/s or less. The thermally conductive grease contains 400 to 2000 parts by mass of the thermally conductive particles based on 100 parts by mass of the liquid olefin polymer. Alumina particles with a median particle diameter of 0.1 to 5 μm constitute 5 to 80% by mass of 100% by mass of the thermally conductive particles. Other thermally conductive particles constitute 20 to 95% by mass of 100% by mass of the thermally conductive particles. The thermally conductive grease has an absolute viscosity at 23° C. of 300 to 7000 Pa·s measured by a B-type viscometer using a T-E spindle at a rotational speed of 5 rpm.

A method for manufacturing the thermally conductive grease of the present invention includes mixing the liquid olefin polymer with the thermally conductive particles, and the thermally conductive particles are added in an amount of 400 to 2000 parts by mass based on 100 parts by mass of the liquid olefin polymer. The liquid olefin polymer is an ethylene α-olefin copolymer having a kinematic viscosity at 40° C. of 10,000 mm²/s or less. Alumina particles with a median particle diameter of 0.1 to 5 μm constitute 5 to 80% by mass of 100% by mass of the thermally conductive particles, and other thermally conductive particles constitute 20 to 95% by mass of 100% by mass of the thermally conductive particles. The thermally conductive grease has an absolute viscosity at 23° C. of 300 to 7000 Pa·s measured by a B-type viscometer using a T-E spindle at a rotational speed of 5 rpm.

Effects of the Invention

The present invention can provide a thermally conductive grease described below. The thermally conductive grease contains a liquid olefin polymer and thermally conductive particles. The liquid olefin polymer is an ethylene α-olefin copolymer having a kinematic viscosity at 40° C. of 10,000 mm²/s or less. The thermally conductive grease contains 400 to 2000 parts by mass of the thermally conductive particles based on 100 parts by mass of the liquid olefin polymer. Alumina particles with a median particle diameter of 0.1 to 5 μm constitute 5 to 80% by mass of 100% by mass of the thermally conductive particles. Other thermally conductive particles constitute 20 to 95% by mass of 100% by mass of the thermally conductive particles. The thermally conductive grease has an absolute viscosity at 23° C. of 300 to 7000 Pa·s measured by a B-type viscometer using a T-E spindle at a rotational speed of 5 rpm. Thus, the thermally conductive grease generates no low molecular weight siloxane and achieves an absolute viscosity and thermal conductive properties suitable for TIM applications. No low molecular weight siloxane is generated since no organopolysiloxane is used as a matrix polymer originally. In addition, the thermally conductive grease can be effectively and efficiently manufactured by a method for manufacturing a thermally conductive grease of the present invention.

DESCRIPTION OF THE INVENTION

Figure 1A:
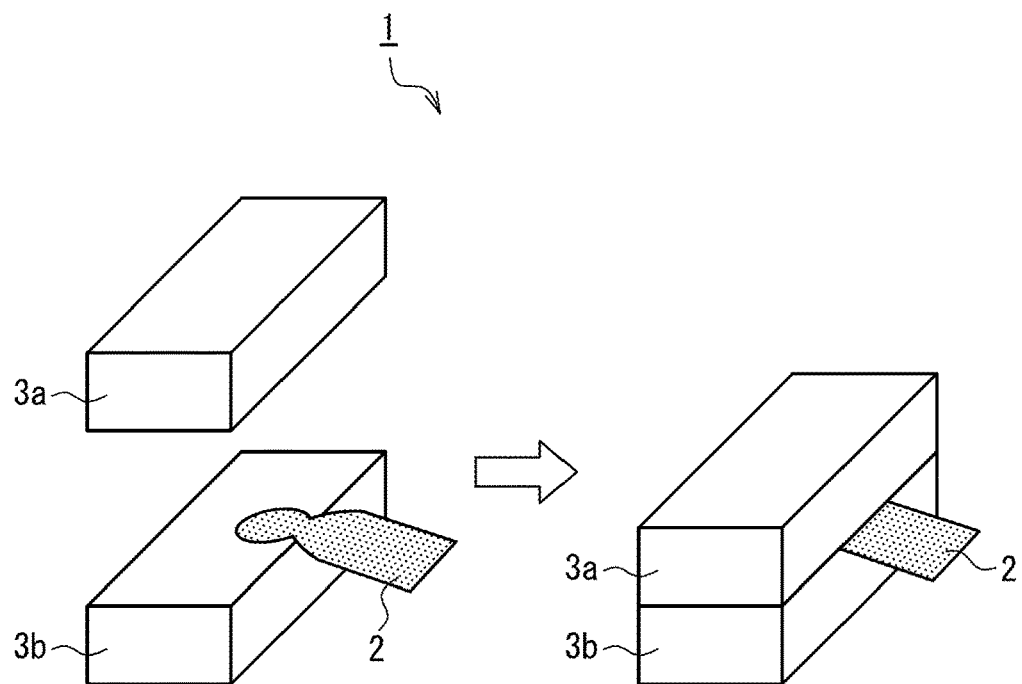
FIGS. 1A and 1B are diagrams illustrating a method of measuring a thermal conductivity of a sample in an example of the present invention.

A thermally conductive grease of the present invention (which may also be referred to as "grease" in the following)

is a thermally conductive grease that contains a liquid olefin polymer as a matrix polymer and thermally conductive particles. The liquid olefin polymer is an ethylene α-olefin copolymer having a kinematic viscosity at 40° C. of 10,000 mm²/s or less. Examples of the ethylene α-olefin copolymer include ethylene-propylene copolymers. This is a hydrocarbon-based synthetic oil containing no polar group and commercially available under the "LUCANT" (product name) series manufactured by Mitsui Chemicals, Inc. The kinematic viscosity at 40° C. of the liquid olefin polymer can be measured by, e.g., a method described in examples.

The liquid olefin polymer may be a mixture of at least two ethylene-propylene copolymers different in kinematic viscosity. The liquid olefin polymer may also be a mixture of at least two ethylene-propylene copolymers having a kinematic viscosity at 40° C. of less than 1,000 mm²/s and a kinematic viscosity at 40° C. of 1,000 mm²/s or more. Thus, overall absolute viscosity is easily adjusted to a predetermined absolute viscosity. If the kinematic viscosity at 40° C. is more than 10,000 mm²/s, it is difficult to mix the liquid olefin polymer with the thermally conductive filler. Moreover, problems tend to occur in terms of use. For example, the overall absolute viscosity tends to be high, which makes it difficult to apply the grease.

The thermally conductive particles are added in an amount of 400 to 2000 parts by mass based on 100 parts by mass of the liquid olefin polymer. If the thermally conductive particles are added in an amount of less than 400 parts by mass, thermal conductive properties are not favorable. If the thermally conductive particles are added in an amount of more than 2000 parts by mass, it is difficult to mix the thermally conductive particles with the liquid olefin polymer. Moreover, problems tend to occur in terms of use. For example, the overall absolute viscosity tends to be high, which makes it difficult to apply the grease.

Alumina (aluminum oxide) particles with a median particle diameter of 0.1 to 5 μm constitute 5 to 80% by mass of the thermally conductive particles, and other thermally conductive particles constitute 20 to 95% by mass of the thermally conductive particles. The alumina particles with a median particle diameter of 0.1 to nm preferably have an irregular shape. The alumina particles having an irregular shape easily achieve low overall absolute viscosity and easily exhibit a high thermal conductivity.

The other thermally conductive particles are preferably particles with a median particle diameter other than 0.1 to 5 μm. In particular, the other thermally conductive particles are preferably thermally conductive particles with a median particle diameter of more than 5 μm. The thermally conductive particles with a median particle diameter of more than 5 μm are preferably particles of at least one selected from the group consisting of alumina (aluminum oxide), zinc oxide, magnesium oxide, aluminum nitride, boron nitride, aluminum hydroxide, and silica other than hydrophilic fumed silica. Examples of the silica other than hydrophilic fumed silica include precipitated silica (wet silica), hydrophobic fumed silica (fumed silica), crystalline silica, and amorphous silica.

When the alumina (aluminum oxide) with a median particle diameter of 0.1 to 5 μm constitutes 5 to 80% by mass of the thermally conductive particles, and the thermally conductive particles with a median particle diameter of more than 5 μm constitute 20 to 95% by mass of the thermally conductive particles, small particles are present between large particles, which provides nearly the closest packing and improves thermal conductive properties. In the present application, the term "median particle diameter" means D50 (median diameter) in a volume-based cumulative particle size distribution, which is determined by a laser diffracted light scattering method. The measuring device may be, e.g., a laser diffraction/scattering particle size distribution analyzer LA-950 S2 manufactured by HORIBA, Ltd.

The thermally conductive grease of the present invention has an absolute viscosity at 23° C. of 300 to 7000 Pa·s, preferably 500 to 6500 Pa·s, and more preferably 600 to 6000 Pa·s as measured by a B-type viscometer using a T-E spindle at a rotational speed of 5 rpm. When the absolute viscosity range is within the above range, the grease is suitable for improving the contact between a heating element such as a semiconductor and a heat dissipater. Such a thermally conductive grease is suitable for thermal interface material (TIM) applications.

The alumina with a median particle diameter of 0.1 to 5 μm is preferably surface treated with an alkoxysilane compound or a partial hydrolysate of the alkoxysilane compound. The alkoxysilane compound is expressed by $R_aSi(OR')_{4-a}$, where R represents a substituted or unsubstituted organic group having 6 to 12 carbon atoms, R' represents an alkyl group having 1 to 4 carbon atoms, and a is 0 or 1. Preferable examples of a silane coupling agent include silane compounds such as hexyltrimethoxysilane, hexyltriethoxysilane, octyltrimethoxysilane, octyltriethoxysilane, decyltrimethoxysilane, decyltriethoxysilane, dodecyltrimethoxysilane, and dodecyltriethoxysilane. The silane compounds may be used alone or in combinations of two or more. The surface treatment may include adsorption in addition to a covalent bond. The surface treatment enhances the mixing of the matrix polymer with the thermally conductive particles.

The silane coupling agent may be previously mixed with the thermally conductive particles in a pretreatment (i.e., a pretreatment method), or may be added when the matrix polymer is mixed with the thermally conductive particles (i.e., an integral blend method). In these methods, the silane coupling agent is preferably added in an amount of 0.01 to 10 parts by mass based on 100 parts by mass of the thermally conductive particles. The surface treatment allows the thermally conductive particles to be blended easily with the matrix polymer.

The grease of the present invention can contain components other than the above as needed. For example, the grease can contain additives such as a heat resistance improver (e.g., colcothar, titanium oxide, or cerium oxide), a flame retardant, and a flame retardant aid. An organic or inorganic particle pigment may be added for the purpose of coloring and toning.

The thermally conductive grease of the present invention has a thermal conductivity of preferably 2 W/mk or more, more preferably 2 to 15 W/mk, and further preferably 2.2 to 10 W/mk. The above thermal conductivity is suitable for TIM applications.

In a method for manufacturing the thermally conductive grease of the present invention, the liquid olefin polymer is mixed with the thermally conductive particles, other additives may be added as needed, and the whole is mixed. This method produces the thermally conductive grease having an absolute viscosity at 23° C. of 300 to 7000 Pa·s measured by a B-type viscometer using a T-E spindle at a rotational speed of 5 rpm. The liquid olefin polymer is an ethylene α-olefin copolymer having a kinematic viscosity at 40° C. of 10,000 mm²/s or less. The thermally conductive particles are added in an amount of 400 to 2000 parts by mass based on 100 parts by mass of the liquid olefin polymer. Alumina particles with a median particle diameter of 0.1 to 5 μm constitute 5 to 80% by mass of 100% by mass of the thermally conductive particles, and other thermally conductive particles constitute 20 to 95% by mass of 100% by mass of the thermally conductive particles.

The thermally conductive grease of the present invention can be packed in, e.g., a dispenser, bottle, can, or tube to be manufactured.

EXAMPLES

Hereinafter, the present invention will be described by way of examples. However, the present invention is not limited to the following examples. Various parameters were measured in the following manner.

<Thermal Conductivity>

Figure 1B:
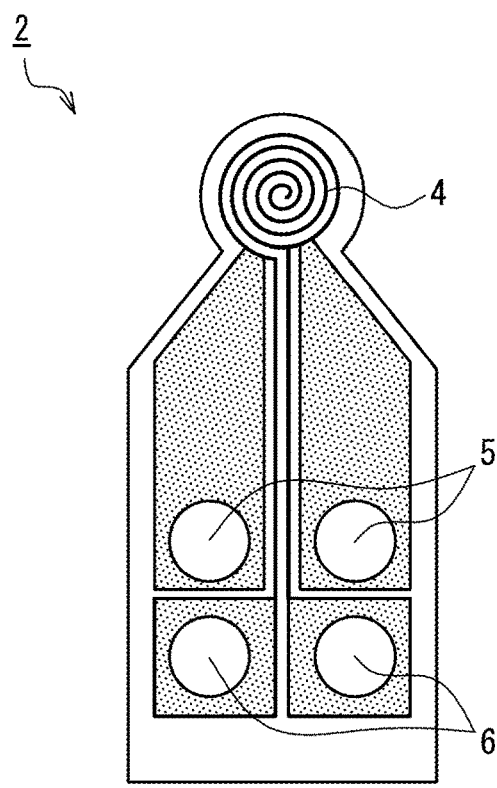

The thermal conductivity of a thermally conductive grease was measured by a hot disk (in accordance with ISO/CD 22007-2). As shown in FIG. 1A, in a thermal conductivity measuring apparatus 1, a polyimide film sensor 2 was sandwiched between two samples 3a, 3b, and constant power was applied to the sensor 2 to generate a certain amount of heat. Then, the thermal characteristics were analyzed from a temperature rise value of the sensor 2. As shown in FIG. 1B, the sensor 2 has a tip 4 with a diameter of 7 mm. The tip 4 has a double spiral structure of electrodes. Moreover, an electrode 5 for an applied current and an electrode 6 for a resistance value (temperature measurement electrode) are located on the lower portion of the sensor 2. The thermal conductivity was calculated by the following formula (1).

$$\lambda = \frac{P_0 \cdot D(\tau)}{\pi^{3/2} \cdot r} \cdot \frac{D(\tau)}{\Delta T(\tau)} \quad \text{[Formula 1]}$$

$\lambda$: Thermal conductivity (W/m·K)
$P_0$: Constant power (W)
r: Radius of sensor (m)
$\tau$: $\sqrt{\alpha \cdot t/r^2}$
$\alpha$: Thermal diffusivity of sample (m$^2$/s)
t: Measuring time (s)
$D(\tau)$: Dimensionless function of $\tau$
$\Delta T(\tau)$: Temperature rise of sensor (K)

<Kinematic Viscosity of Ethylene-Propylene Copolymer>

A catalogue or the like provided by a manufacturer describes kinematic viscosities. The kinematic viscosities were kinematic viscosities at 40° C. measured by a Ubbelohde viscometer.

<Absolute Viscosity of Grease>

The absolute viscosities of greases at 23° C. were measured by a B-type viscometer (HBDV2T manufactured by Brookfield Company) using a T-E spindle at a rotational speed of 5 rpm. However, in Comparative example 1, a T-F spindle was used since the absolute viscosity was more than the maximum viscosity measured using the T-E spindle.

Examples 1-4 and Comparative Examples 1-2

1. Raw Material Components
(1) Liquid Olefin Polymer
   Ethylene-propylene copolymer having a kinematic viscosity at 40° C. of 400 mm$^2$/s: "LUCANT LX004" (product name) manufactured by Mitsui Chemicals, Inc.
   Ethylene-propylene copolymer having a kinematic viscosity at 40° C. of 9850 mm$^2$/s: "LUCANT LX100" (product name) manufactured by Mitsui Chemicals, Inc.
   Ethylene-propylene copolymer having a kinematic viscosity at 40° C. of 37500 mm$^2$/s: "LUCANT LX400" (product name) manufactured by Mitsui Chemicals, Inc.
(2) Thermally Conductive Particles
   Irregular alumina with a median particle diameter of 2.3 µm: a product pretreated with decyltrimethoxysilane (1.1 g of decyltrimethoxysilane was adsorbed based on 100 g of the alumina)
   Irregular alumina with a median particle diameter of 0.3 µm: a product pretreated with octyltrimethoxysilane (2.4 g of octyltrimethoxysilane was adsorbed based on 100 g of the alumina)
   Spherical alumina (not surface treated) with a median particle diameter of 20 µm
   Spherical alumina (not surface treated) with a median particle diameter of 35 µm
   Irregular silica (amorphous silica, not surface treated) with a median particle diameter of 20 µm
   Aluminum hydroxide (not surface treated) with a median particle diameter of 20 µm
2. Mixing Method
   The liquid olefin polymers were mixed with the thermally conductive particles to produce thermally conductive greases.
   The greases thus obtained were evaluated. Table 1 indicates conditions and results together.

TABLE 1

|  | Example 1 | Example 2 | Example 3 | Example 4 | Comparative Example 1 | Comparative Example 2 |
|---|---|---|---|---|---|---|
| Ethylene-propylene copolymer Kinematic viscosity of 400 mm$^2$/s (g) | 100 | 60 | 100 | 100 | — | — |
| Ethylene-propylene copolymer Kinematic viscosity of 9850 mm$^2$/s (g) | — | 40 | — | — | 50 | — |
| Ethylene-propylene copolymer Kinematic viscosity of 37500 mm$^2$/s (g) | — | — | — | — | 50 | 100 |
| Irregular alumina, D50 = 2.3 µm Surface treated product (g) | 650 | 650 | 400 | 400 | 650 | 650 |
| Irregular alumina, D50 = 0.3 µm Surface treated product (g) | 50 | 50 | — | — | 50 | 50 |
| Spherical alumina, D50 = 20 µm (g) | 550 | 550 | — | — | 550 | 550 |
| Spherical alumina, D50 = 35 µm (g) | — | — | 600 | 600 | — | — |
| Irregular silica, D50 = 20 µm (g) | — | — | 200 | — | — | — |

TABLE 1-continued

|  | Example 1 | Example 2 | Example 3 | Example 4 | Comparative Example 1 | Comparative Example 2 |
|---|---|---|---|---|---|---|
| Aluminum hydroxide, D50 = 20 μm (g) | — | — | — | 200 | — | — |
| Thermal conductivity (W/mk) Hot disk method | 2.6 | 2.6 | 2.4 | 3.1 | 2.7 | Unable to fill |
| Absolute viscosity (Pa · s, B-type viscometer) | 1200 | 2200 | 1050 | 2500 | 13000 | Unable to fill |

The results confirmed that the thermally conductive grease of each of Examples 1-4 was grease-like, generated no low molecular weight siloxane, and achieved an absolute viscosity and thermal conductive property suitable for TIM applications. No low molecular weight siloxane was generated since no organopolysiloxane was used as a matrix polymer originally.

INDUSTRIAL APPLICABILITY

The thermally conductive grease of the present invention is suitable for TIM (thermal interface material) applications in which a thermal interface material is filled between a heating element such as an electrical component, an electronic component or the like and a heat dissipater.

DESCRIPTION OF REFERENCE NUMERALS

1 Thermal conductivity measuring apparatus
2 Sensor
3a, 3b Sample
4 Tip of the sensor
5 Electrode for an applied current
6 Electrode for a resistance value (temperature measurement electrode)

The invention claimed is:

1. A thermally conductive grease, comprising:
a liquid olefin polymer; and
thermally conductive particles,
wherein
the liquid olefin polymer is a mixture of at least two ethylene α-olefin copolymers having a kinematic viscosity at 40° C. of less than 1,000 mm$^2$/s and a kinematic viscosity at 40° C. of 1,000 mm$^2$/s or more and the kinematic viscosity of the mixture at 40° C. is 10,000 mm$^2$/s or less,
the thermally conductive grease comprises 400 to 2000 parts by mass of the thermally conductive particles based on 100 parts by mass of the liquid olefin polymer,
alumina particles with a median particle diameter of 0.1 to 5 μm constitute 5 to 80% by mass of 100% by mass of the thermally conductive particles, and other thermally conductive particles constitute 20 to 95% by mass of 100% by mass of the thermally conductive particles, and the other thermally conductive particles are thermally conductive particles with a median particle diameter of more than 5 μm,
the alumina particles with a median particle diameter of 0.1 to 5 μm have an irregular shape,
the alumina particles with a median particle diameter of 0.1 to 5 μm are surface treated with a silane coupling agent that is an alkoxysilane compound or a partial hydrolysate of the alkoxysilane compound, and the alkoxysilane compound is expressed by R$_a$Si(OR')$_{4-a}$, where R represents a substituted or unsubstituted organic group having 6 to 12 carbon atoms, R' represents an alkyl group having 1 to 4 carbon atoms, and a is 0 or 1, and the silane coupling agent is added in an amount of 0.01 to 10 parts by mass based on 100 parts by mass of the thermally conductive particles to perform the surface treatment,
and,
the thermally conductive grease has an absolute viscosity at 23° C. of 300 to 7000 Pa·s measured by a B-type viscometer using a T-E spindle at a rotational speed of 5 rpm.

2. The thermally conductive grease according to claim 1, wherein the thermally conductive particles with a median particle diameter of more than 5 μm are particles of at least one selected from the group consisting of alumina, zinc oxide, magnesium oxide, aluminum nitride, boron nitride, aluminum hydroxide, and silica other than hydrophilic fumed silica.

3. The thermally conductive grease according to claim 1, wherein the thermally conductive grease has a thermal conductivity of 2 W/mk or more.

4. The thermally conductive grease according to claim 1, wherein the thermally conductive grease contains no organopolysiloxane.

5. A method for using the thermally conductive grease according to claim 1 as a thermal interface material that is filled between an electrical component or an electronic component and a heat dissipater.

6. A method for manufacturing the thermally conductive grease according claim 1, comprising:
mixing the liquid olefin polymer with the thermally conductive particles, the thermally conductive particles being added in an amount of 400 to 2000 parts by mass based on 100 parts by mass of the liquid olefin polymer,
wherein
the liquid olefin polymer is a mixture of at least two ethylene α-olefin copolymers having a kinematic viscosity at 40° C. of less than 1,000 mm$^2$/s and a kinematic viscosity at 40° C. of 1,000 mm$^2$/s or more and the kinematic viscosity of the mixture at 40° C. is 10,000 mm$^2$/s or less,
alumina particles with a median particle diameter of 0.1 to 5 μm constitute 5 to 80% by mass of 100% by mass of the thermally conductive particles, and other thermally conductive particles constitute 20 to 95% by mass of 100% by mass of the thermally conductive particles, and the other thermally conductive particles are thermally conductive particles with a median particle diameter of more than 5 μm,
the alumina particles with a median particle diameter of 0.1 to 5 μm have an irregular shape,
the alumina particles with a median particle diameter of 0.1 to 5 μm are surface treated with a silane coupling agent that is an alkoxysilane compound or a partial hydrolysate of the alkoxysilane compound, and the alkoxysilane compound is expressed by R$_a$Si(OR')$_{4-a}$, where R represents a substituted or unsubstituted organic group having 6 to 12 carbon atoms, R' represents an alkyl group having 1 to 4 carbon atoms, and a is 0 or 1, and the silane coupling agent is added in an amount of 0.01 to 10 parts by mass based on 100 parts by mass of the thermally conductive particles to perform the surface treatment, and the thermally conductive grease has an absolute viscosity at 23° C. of 300 to 7000 Pa·s measured by a B-type viscometer using a T-E spindle at a rotational speed of 5 rpm.

7. The method for manufacturing the thermally conductive grease according to claim 6, wherein the thermally conductive grease contains no organopolysiloxane.

\* \* \* \* \*